J. WALDSCHMIDT.
TOOL FOR EXPANDING AND CONTRACTING TIRE RIMS.
APPLICATION FILED MAY 8, 1915.

1,204,621.

Patented Nov. 14, 1916.
2 SHEETS—SHEET 1.

Witnesses:
Robert F. Bracke
Albin C. Ahlberg

Inventor
Jacob Waldschmidt
By Williams + Bradbury
Attorneys

J. WALDSCHMIDT.
TOOL FOR EXPANDING AND CONTRACTING TIRE RIMS.
APPLICATION FILED MAY 8, 1915.

1,204,621.

Patented Nov. 14, 1916.
2 SHEETS—SHEET 2.

Witnesses:
Robert F. Bracke
Albin C. Ahlberg

Inventor
Jacob Waldschmidt
By Williams & Bradbury
Attorneys

UNITED STATES PATENT OFFICE.

JACOB WALDSCHMIDT, OF FOND DU LAC, WISCONSIN.

TOOL FOR EXPANDING AND CONTRACTING TIRE-RIMS.

1,204,621.  Specification of Letters Patent.  Patented Nov. 14, 1916.

Application filed May 8, 1915. Serial No. 26,714.

*To all whom it may concern:*

Be it known that I, JACOB WALDSCHMIDT, a citizen of the United States, residing at Fond du Lac, in the county of Fond du Lac and State of Wisconsin, have invented a certain new and useful Improvement in Tools for Expanding and Contracting Tire-Rims, (Case 1,) of which the following is a full, clear, concise, and exact description, reference being had to the accompanying drawings, forming a part of this specification.

My invention relates to tools for expanding and contracting tire rims, and has for its object the provision of a simple tool for expanding or contracting a tire rim to permit a tire to be placed thereon or removed therefrom.

Generally, the device of my invention consists in a pair of pivoted angle arms, the angle interposed between the arms on one side of the pivot when the tool is set for contracting being larger than the angle interposed between the arms on the other side of the pivot, whereby the tool may be easily and quickly set for either expanding or contracting the tire rim. In order to permit the tool to be used with any one of the many kinds of split tire rims, I provide adjustable engaging devices carried by the ends of the pivoted arms.

Figure 1:
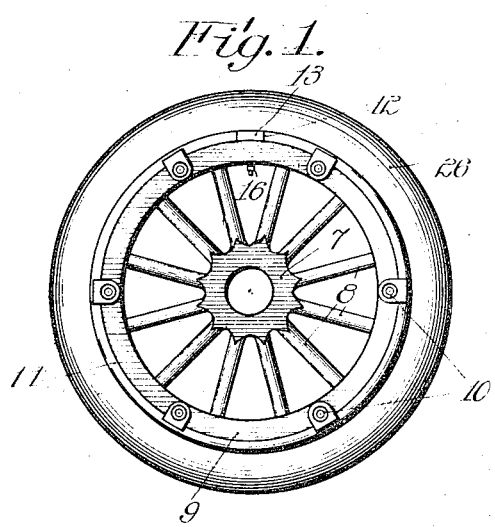
Figure 2:
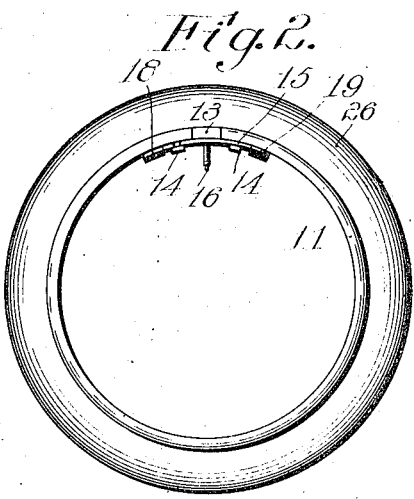
Figure 3:
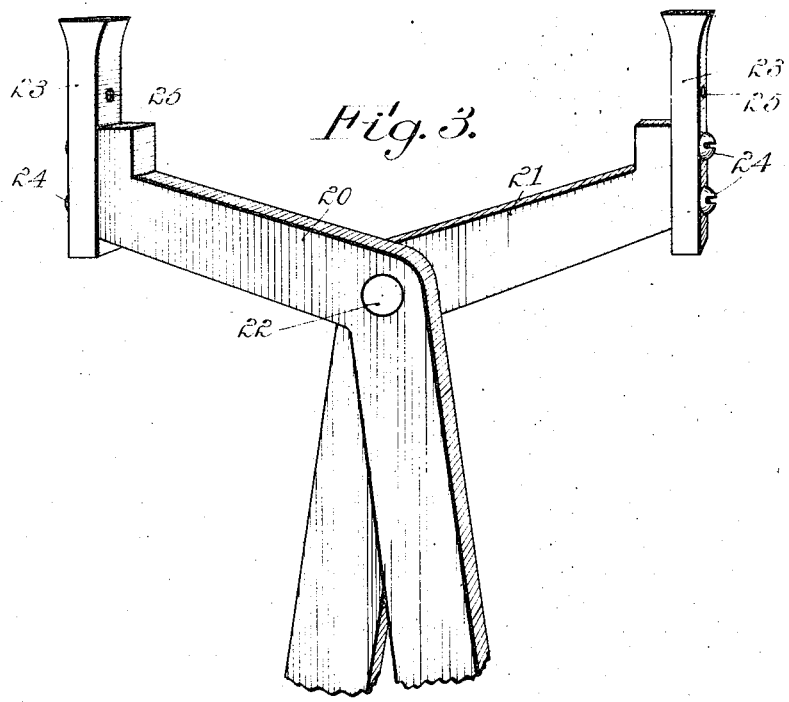
Figure 4:
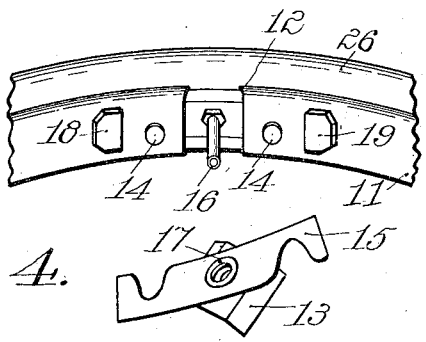
Figure 5:
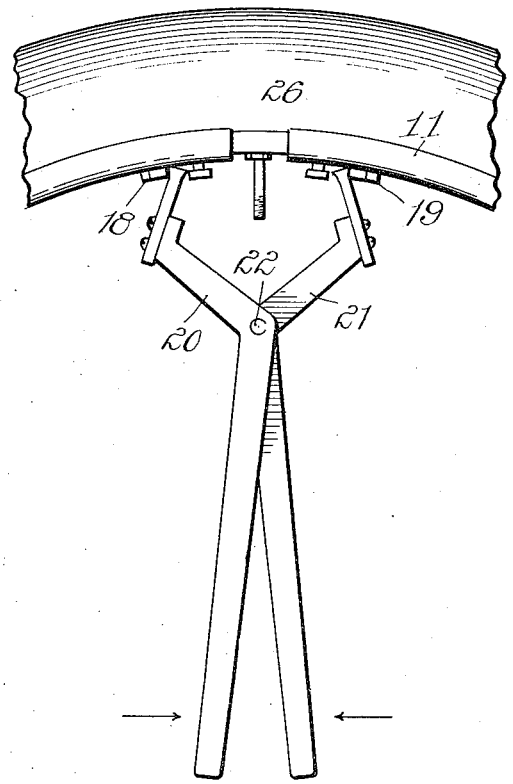
Figure 6:
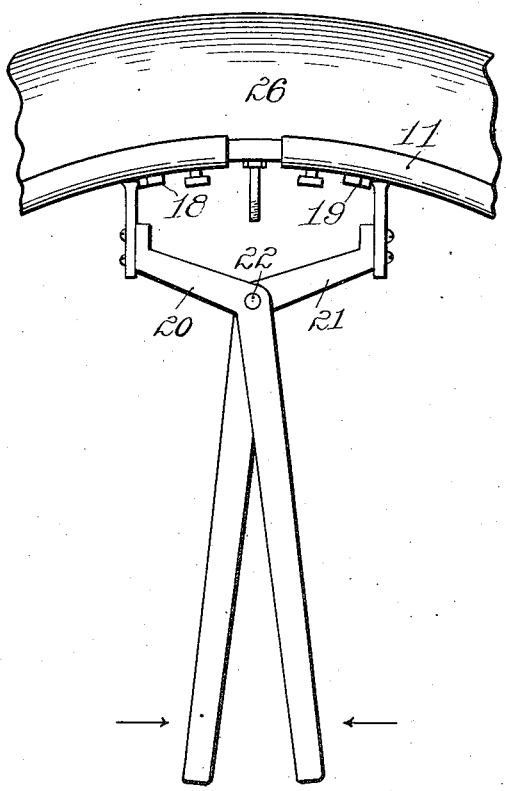

My invention will be more clearly understood by referring to the accompanying drawings in which, Figure 1 is a front elevational view of an automobile wheel provided with a split rim for retaining the pneumatic tire in position. Fig. 2 is a front elevational view of the pneumatic tire and rim, the same being removed from the automobile wheel. Fig. 3 is a perspective view of a portion of the tool of my invention. Fig. 4 is a fragmentary perspective view of the tire and split rim. The filler for the rim is shown removed from the same in this figure. Fig. 5 is a view of a portion of the pneumatic tire and rim and the tool of my invention set for expanding the rim; and Fig. 6 is a view similar to Fig. 5 showing the tool set for contracting a split rim, Similar reference characters refer to similar parts throughout the several views.

In Fig. 1, I have illustrated at 7 an automobile wheel comprising the spokes 8—8, and a felly 9. Held on the periphery of the felly by means of adjustable bolts and keepers 10—10 is a split rim 11 adapted to hold a tire 26. This rim, as most clearly illustrated in Fig. 4, has a portion cut away at 12 into which is arranged to be inserted a filler 13 which has substantially the same cross section as the rim. Devices are provided for holding the filler in place between the ends of the rim, which are shown at 14—14 in the form of pins adapted to be engaged by a pivoted arm 15 journaled on the filler 13. A valve stem is illustrated at 16 which is arranged to extend through an aperture 17 provided in the filler 13 and pivoted arm 15. Lugs 18 and 19 are positioned adjacent the pins 14—14 to serve as protecting means for the arm 15, and also as abutment members for permitting the rim to be expanded or contracted, as will be pointed out.

The device of my invention consists in a pair of angle arms 20 and 21 pivoted together at 22 at the apex of each of the angle arms. The ends of the arms above the pivot may be bent toward each other so as to lie substantially in the same plane, but the handle ends of the arms, or the ends disposed below the pivot 22 lie in different planes so as to permit passing of the arms relative to each other. Adjustably mounted on the end of each of the arms is a hardened steel engaging device 23 which is flared outwardly on both sides at its upper end to provide a non-slipping engaging face. Any means may be provided for adjustably attaching these hardened steel engaging devices to the arms. I have illustrated screws 24—24 extending through the engaging devices into the angle arms. A third aperture is provided in each of the engaging devices at 25 whereby the devices may be moved downwardly (Fig. 3). Attention is called to the fact that when the tool is set to the position illustrated in Fig. 3 the angle interposed between the arms above the pivot 22 is greater than the angle interposed between the arms below the pivot.

The operation of the device is as follows: In placing the tire upon the split rim 11 the tool is set to the position illustrated in Fig. 6 and caused to engage the outside faces of the lugs 18 and 19. By applying power in the direction indicated by the arrows in this figure the arms above the pivot will be caused to move inwardly to cause contraction of the tire rim. After the rim has thus been contracted a sufficient amount the tire may be placed thereon. The next step is to insert the filler 13 into the cut away portion of the tire rim. To effect this insertion of the filler the tool is set to the position illustrated in Fig. 5. The setting of the tool to this last mentioned position is easily accomplished by moving the handle arms of the tool toward and beyond each other until they reach the position illustrated in Fig. 5. The engaging devices of the upper ends of the arms are then caused to engage the inner faces of the lugs 18 and 19. By applying pressure in the direction indicated by the arrows in this figure the arms above the pivot will be caused to move outwardly and thus expand the tire rim to permit insertion of the filler 13.

In removing the tire from the rim the tool is inserted between the lugs 18 and 19, as illustrated in Fig. 5, and the rim expanded to permit removal of the filler. After the filler has been removed the tool is set to the position illustrated in Fig. 6 and the tire contracted whereby the removal of the tire may be caused.

It will, of course, be understood that the tool of my invention can be used in connection with any one of the many kinds of split rims. As, for example, it may be used in connection with a rim that is provided with a plurality of apertures to permit the insertion of the engaging end of the tool arms.

Having thus described my invention, what I claim as new and desire to secure by United States Letters Patent is:

A tool for expanding and contracting the type of divided demountable rims which have oppositely facing tool engageable abutments on each side of the division of the rim, the abutment faces engaged for expanding the rim being closer together than the faces engaged for contracting the rim, said tool comprising a pair of angle members pivoted together to form handles and rim engaging parts, the arms forming handles for said tool being adapted to pass each other to assume positions such that movement of the handle portions toward each other will cause the separation of the tire engaging portions of the tool when the tool is engaged for expanding the rim and also such that the movement of the handle portions of the tool toward each other will cause the contraction of the rim engaging portions of the tool when the tool engages the faces of the abutments of the rim for contracting the rim, whereby the rim may be either expanded or contracted by the movement of the handle members toward one another.

In witness whereof, I hereunto subscribe my name this 5 day of May, A. D. 1915.

JACOB WALDSCHMIDT.

Witnesses:
 M. E. BERGEMANN,
 ROBERT F. BRACKE.